United States Patent [19]

Stone et al.

[11] 4,164,806

[45] Aug. 21, 1979

[54] METHOD FOR ATTACHING AN END BEAD TO A MUSICAL INSTRUMENT STRING

[75] Inventors: W. Norman Stone, Bloomfield, Conn.; Robert A. Allmansberger, Bridgewater, N.J.

[73] Assignee: National Musical String Company, New Brunswick, N.J.

[21] Appl. No.: 843,210

[22] Filed: Oct. 18, 1977

Related U.S. Application Data

[63] Continuation-in-part of Ser. No. 757,082, Jan. 5, 1977, abandoned.

[51] Int. Cl.[2] ........................ B21D 39/00; B23P 11/00

[52] U.S. Cl. .................................... 29/517; 84/297 S; 156/644; 156/664

[58] Field of Search .......................... 29/515, 517, 445; 156/634, 664, 644; 84/297 R, 297 S, 199

[56] References Cited

U.S. PATENT DOCUMENTS

| | | | |
|---|---|---|---|
| 2,209,673 | 7/1940 | Bratz | 29/515 X |
| 2,433,353 | 12/1947 | Escoffery et al. | 156/664 |
| 2,535,143 | 12/1950 | Kosmis | 84/297 S |
| 2,718,485 | 9/1955 | Samuely | 156/634 |
| 2,832,118 | 4/1958 | Ekmann | 29/517 X |
| 2,992,904 | 7/1961 | Marel et al. | 156/664 X |
| 3,304,602 | 2/1967 | Osborne | 29/517 UX |
| 3,320,356 | 5/1967 | Kirwin | 29/517 X |
| 3,583,060 | 6/1971 | Sigmans | 29/517 X |

*Primary Examiner*—Charlie T. Moon

*Attorney, Agent, or Firm*—McCormick, Paulding & Huber

[57] ABSTRACT

A metallic end bead is attached to the main wire of a musical instrument string by providing the bead in apertured form, roughening or otherwise irregularizing its hole surface and then plastically deforming it to press its hole surface irregularities into the surface of a wire inserted through the hole. The bead has tapered end portions to inhibit cracking during the deforming step. The process is one lending itself to economical mass production of beaded strings and the beads may be provided with either a matte or polished finish on their visible surfaces.

11 Claims, 1 Drawing Figure

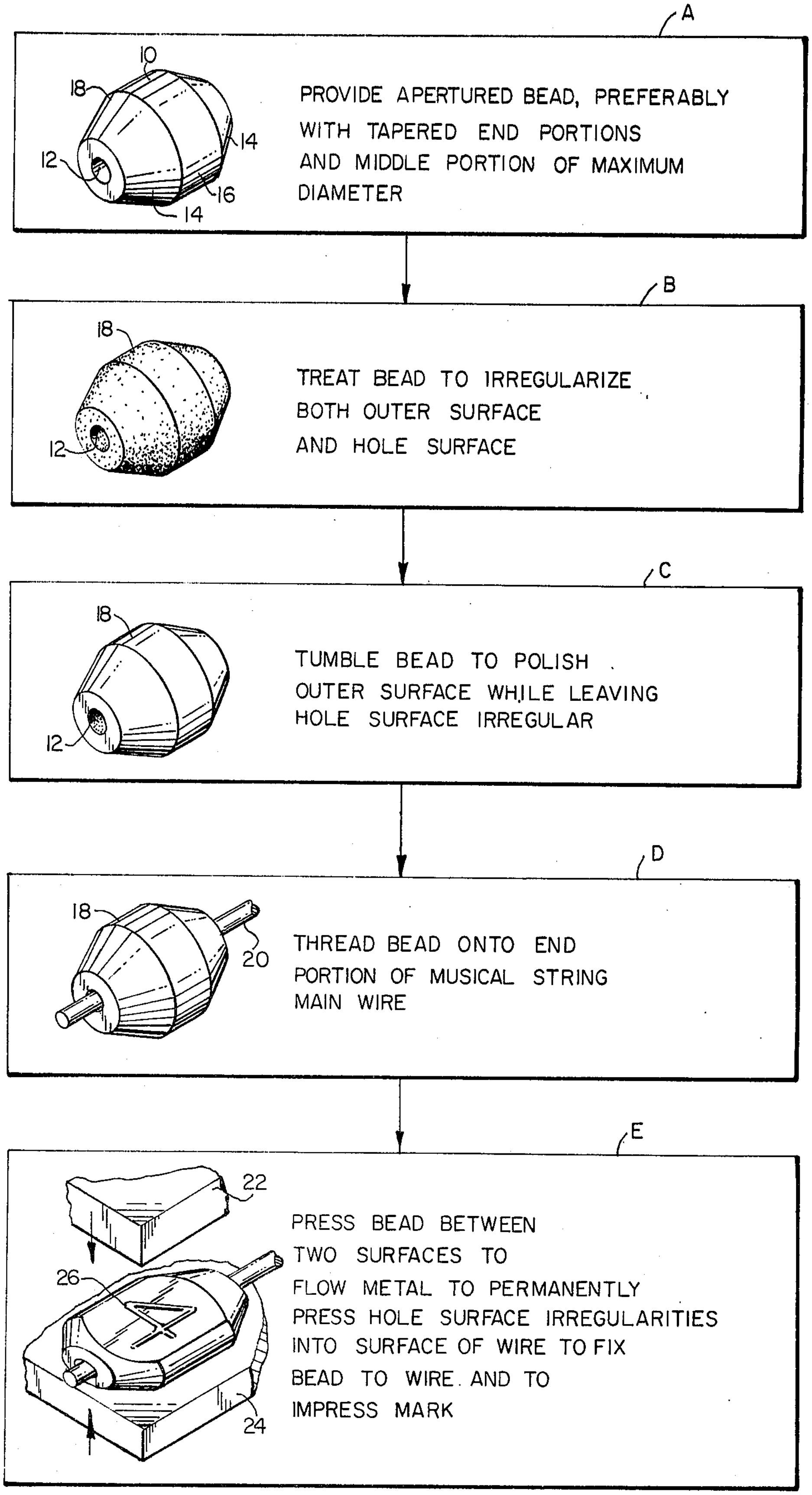
A
10
18
12
14
16
14
PROVIDE APERTURED BEAD, PREFERABLY WITH TAPERED END PORTIONS AND MIDDLE PORTION OF MAXIMUM DIAMETER
B
18
12
TREAT BEAD TO IRREGULARIZE BOTH OUTER SURFACE AND HOLE SURFACE
C
18
12
TUMBLE BEAD TO POLISH OUTER SURFACE WHILE LEAVING HOLE SURFACE IRREGULAR
D
18
20
THREAD BEAD ONTO END PORTION OF MUSICAL STRING MAIN WIRE
E
22
26
18
24
PRESS BEAD BETWEEN TWO SURFACES TO FLOW METAL TO PERMANENTLY PRESS HOLE SURFACE IRREGULARITIES INTO SURFACE OF WIRE TO FIX BEAD TO WIRE AND TO IMPRESS MARK

METHOD FOR ATTACHING AN END BEAD TO A MUSICAL INSTRUMENT STRING

CROSS-REFERENCE TO RELATED APPLICATION

This application is a continuation-in-part of application Ser. No. 757,082, filed Jan. 5, 1977, now abandoned.

BACKGROUND OF THE INVENTION

This invention relates to musical instrument strings, and deals more particularly with a method for making such strings of the type having beads at one end thereof for use in attaching the strings to musical instruments. It also relates to the construction of end beads for use in practicing the method.

As to general subject matter, this invention is related to copending U.S. Pat. Application Ser. No. 699,707, filed June 25, 1976, now abandoned, which shows another method for fixing beads to musical instrument strings. As explained in the copending application, strings for many musical instruments commonly carry a bead at one end thereof, in the shape of a ball, cylinder, ferrule or the like, to provide an enlargement on the string for use in attaching it to a compatibly designed bridge or tailpiece. At present, a conventional way of attaching a string to a bead is to loop the string around an externally waisted portion of the bead and to then twist the short length of the loop around the longer length. This attachment method is a relatively difficult and time-consuming one whether done by hand or machine and results in a twisted portion of the string adjacent the bead which is not only somewhat unsightly but also of a larger diameter than the remaining untwisted portion of the string. Also, after the bead is attached to the string, if the string is tested by applying a tension load through the bead to the string, it usually will be found to have a breaking strength substantially less than a similar unbeaded string.

The general object of this invention is, therefore, to provide a simple and efficient method for attaching end beads to musical instrument strings and which method, particularly under high volume or mass production conditions, enables beads to be attached to strings at relatively low cost per string. In keeping with this object, a still further object is to provide an attachment method which avoids the need for either hand looping and twisting operations or relatively complex machinery to mechanically perform such looping and twisting.

A further object of this invention is to provide a method for attaching an end bead to a musical instrument string which method results in a string having a higher breaking strength than similar strings with beads attached by twisting.

Another object of the invention is to provide a bead attachment method of the foregoing character whereby the resulting finished string has an attractively neat appearance and does not include any portion where the main wire of the string is twisted upon itself.

Another object of this invention is to provide a bead for use in accordance with the method of the invention and which bead is particularly immune to cracking or other failure during the step of its deformation.

The method and bead of this invention may be applied to either an unwound string in which the string consists merely, except for the bead, of a single metallic wire, or they may also be applied to a wound string consisting, apart from the bead, of a metallic core wire carrying a helically wound cover wire or wrap. Hereinafter, the term "main wire" is used to refer to the wire to which the bead is fixed whether it be the sole wire of an unwound string or the core wire of a wound string.

SUMMARY OF THE INVENTION

The invention resides in the method for fixing a metal bead to the main wire of a musical instrument string by roughening or otherwise irregularizing the inner surface of a hole passing through the bead and by thereafter plastically deforming the bead to permanently press the hole surface irregularities into the surface of a wire inserted into the hole.

The invention more specifically resides in the irregularizing of the bead hole surface being performed by exposing the entire bead to an irregularizing environment thereby irregularizing both the outer surface and the hole surface of the bead simultaneously. Thereafter, before assembling the bead with the wire, and if a different appearance is desired for the outside surface of the bead, the bead may be tumbled to clean and/or polish its outer surface while leaving the hole surface irregular.

In still more specific aspects, the invention resides in the irregularizing of the bead being accomplished through a heat treating step and in the bead having tapered end portions and a middle portion of maximum diameter.

BRIEF DESCRIPTION OF THE DRAWING

The drawing is a diagram illustrating the various steps in the method of this invention.

BRIEF DESCRIPTION OF THE PREFERRED EMBODIMENT

The steps of the method of this invention, and also the preferred shape of bead to use in practicing the method, are shown in general by the drawing. The first step in the method, indicated at A, is to provide a metal bead apertured by way of a hole 12 extending through its body. The particular shape of bead used may vary without departing from the broader aspects of the invention, but preferably, and in accordance with more specific features of the invention it has a shape as shown in the drawing, such shape being one with two tapered, conical end portions 14, 14 and a cylindrical middle portion 16 of maximum diameter. The bead may be made by machining, casting, extrusion, stamping, cold forging, hot forging or any other suitable manufacturing process or combination of processes, machining being the presently preferred process. In any event, the bead provided for this step has a mill finish on both its outer surface 18 and on the surface of its hole 12, which finish is usually relatively smooth. Various different metals such as steel (stainless or not), brass, copper or aluminum may be used for the bead depending on the metal of the wire to which it is to be attached. As a general rule, the bead metal and wire metal should be chosen so as to have approximately equal shear strengths so that after the bead is fixed to the wire, as hereinafter described, neither the bead nor the wire will fail in shear much in advance of the other as the shear load between the two is increased. A very common wire metal is steel and in this case, the bead metal may also be steel or some other ferrous metal. The presently preferred metal for the bead is 303 stainless steel.

The second step of the method is to treat the surface of the bead hole 12 to provide such surface with a roughened or otherwise irregularized character giving it "tooth" for gripping the wire when the bead is subsequently deformed, that is a character whereby the surface 12 consists of relatively finely spaced microscopic irregularities or asperities or lines or areas of hard material adjacent other areas of softer material. Since it is generally difficult to treat the hole surface 12 without treating the exterior surface 18, this step is preferably carried out, as indicated at B in the drawing, by exposing the entire bead to a treating environment so that both the outer surface 18 and hole surface 12 are treated simultaneously. This further has the advantage that it readily allows a large number or batch of beads to be handled simultaneously. For example, the treatment may consist of roughening the surface of the bead by an etching process, and in this case a batch of beads may be etched by immersing them in a bath of etchant for a proper amount of time and by then removing, rinsing and drying the beads as a batch. Any etching process known to the art and suitable for the particular metal of the bead in question may be used for the etching step. In particular, the step may be carried out by exposing the beads to either liquid or gaseous etching environments either with or without the use of heat. For metals susceptible of treatment in such way, one method of etching the bead is to heat it, individually or as part of a batch, in an oxidizing atmosphere such as open air.

In addition to or instead of the beads being heated in an oxidizing atmosphere only to create a roughened or etched surface finish, the beads may also be treated by heat to change their crystalline structure in such a way as to create areas or lines of relatively hard material in a softer matrix. For example, and in the preferred case, when the beads are made of stainless steel they are treated by heating them to and soaking them at a temperature close to their melting point in the presence of air, followed by cooling. This causes the grains of the metal to grow in size, making the metal more soft and malleable, and also causes the formation of hard carbides at the grain boundaries both from carbon already in the metal and from carbon absorbed from the air.

After the bead has been treated, it may be attached to its wire, as discussed below. In some cases where the entire bead is treated the finish appearing on the outside bead surface 18 may be an acceptable matte finish and in these cases, the bead may be forthwith attached to the wire without further processing. In other cases, however, the finish may be unwanted either because of its roughness or color. For example, if the bead is treated by heating it in an oxidizing atmosphere, undesirable discoloration of the outer surface 18 may occur. Therefore, to improve the appearance of the outer surface, it may be optionally cleaned and/or polished prior to application of the bead to the string. The procedure used, however, must be one which does not substantially change the roughened or irregularized nature of the hole surface. As shown at C in the figure, this optional step is preferably carried out by tumbling the bead as through the use of conventional tumbling equipment and in the presence of a conventional tumbling medium. Again, this step is one in which a complete batch of beads may be readily processed at one time.

After the surface of the hole 12 of the bead is treated to irregularize it, and the outer surface of the bead thereafter optionally polished or cleaned, if desired, the bead is next threaded onto the end portion of a musical instrument main wire 20 as shown at D in the drawing. The size of the bead hole 12 is such that the bead may be easily slid onto the wire 20.

As a final step of the method, after the bead 10 is placed on its wire 20, is is plastically deformed, as indicated at E in the drawing, to displace its hole surface radially inwardly against the surface of the wire 20 and to thereby permanently press or coin the irregularities of the hole surface into the surface of the wire to fix or lock the bead to the wire. This plastic deformation of the bead may be achieved in various ways as by simply striking the bead with a hammer while holding it against an anvil. Preferably, however, it is carried out as a controlled pressing step wherein the bead is squeezed between two dies operated by a suitable mechanical press. In the most preferred case, the bead is of the shape shown in the drawing, is made of stainless steel, is irregularized by heat treatment to create grain boundary carbides and is pressed between two dies 22,24, having substantially flat parallel die surfaces, as shown, to deform the bead to the shape illustrated. That is, the two dies engage the thick middle portion 16 of the bead and flatten it on both sides with metal flow occurring both laterally and longitudinally. One or both of the dies may also be engraved so as to raise or otherwise impress an indicium or mark, as indicated at 26, on one or both of the flattened faces of the bead. Such mark might, for example, be a trademark or some sort of identifier for the string, and in the illustrated case, the mark in the form of the numeral 4 might be used to indicate that the string is intended to be used as the fourth string of a guitar.

The shape of the bead 10 illustrated in the drawing is also one which reduces cracking of the bead during its deformation. The reason for this is that the major stress and deformation occurs in the thick middle portion 16 of the bead where there are no dicontinuities tending to serve as points of stress concentration. In each tapered portion 14 the stress and deformation diminish in going from the middle portion 16 to the adjacent end so that the stress deformation at both ends of the bead, where cracks are inclined to initiate, is substantially less than elsewhere in the bead. Also, the spacing between the two dies 22, 24, when they are closed on the bead, is preferably controlled by providing a stop to prevent them from flattening the bead beyond a given point and from thereby overstressing the bead material.

We claim:

1. The method of attaching a metal bead to the main wire of a musical instrument string, which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, said hole of said bead being defined by a hole surface having irregularities, threading said bead onto the end portion of a musical instrument main wire, and then plastically deforming said bead by pressing its middle portion between two generally flat and parallel surfaces to flow the metal of said bead and to permanently press said irregularities of said hole surface into the surface of said wire to fix said bead to said wire, whereby the deformation which occurs at said ends of said bead during said pressing step is substantially less than that which occurs in said middle portion.

2. The method of attaching a metal bead to the main wire of a musical instrument string which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, treating said bead to irregularize its hole surface, threading said bead onto the end portion of a musical instrument main wire, and then plastically deforming said bead by pressing its middle portion between two surfaces to permanently press its hole surface irregularities into the surface of said wire to fix said bead to said wire, said step of treating said hole surface of said bead being carried out by exposing said bead in its entirety to a treating environment so that both its outer surface and its hole surface become irregularized.

3. The method of attaching a metal bead to the main wire of a musical instrument string which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, treating said bead to irregularize its hole surface, threading said bead onto the end portion of a musical instrument main wire, and then plastically deforming said bead by pressing its middle portion between two surfaces to permanently press its hole surface irregularities into the surface of said wire to fix said bead to said wire, said step of irregularizing said hole surface of said bead being carried out by immersing said bead in a liquid etchant so that both its outer surface and its hole surface become etched.

4. The method of attaching a metal bead to the main wire of a musical instrument string which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, treating said bead to irregularize its hole surface, threading said bead onto the end portion of a musical instrument main wire, and then plastically deforming said bead by pressing its middle portion between two surfaces to permanently press its hole surface irregularities into the surface of said wire to fix said bead to said wire, said step of irregularizing said hole surface of said bead being carried out by heating said bead in an oxidizing atmosphere so that both its outer surface and its hole become irregularized.

5. The method of attaching a metal bead to the main wire of a musical instrument string which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, treating said bead to irregularize its hole surface, threading said bead onto the end portion of a musical instrument main wire, and then plastically deforming said bead by pressing its middle portion between two surfaces to permanently press its hole surface irregularities into the surface of said wire to fix said bead to said wire, said step of irregularizing said hole surface of said bead being carried out by heat treating said bead to increase its grain size and to cause the formation and accumulation of harder materials at the grain boundaries located on said hole surface.

6. The method of attaching a metal bead to the main wire of a musical instrument string as defined in claim 5 further characterized by said bead being made of stainless steel.

7. The method of attaching a metal bead to the main wire of a musical instrument string which method comprises the steps of: providing a metal bead having two ends and a hole extending therethrough between said ends and also having a middle portion of maximum thickness and two end portions on opposite sides of said middle portion each of which diminishes in thickness in going from said middle portion to the adjacent one of said two ends, treating said bead to irregularize its hole surface, threading said bead onto the end portion of a musical instrument main wire, and then plastically deforming said bead by pressing its middle portion between two surfaces to permanently press its hole surface irregularities into the surface of said wire to fix said bead to said wire, said middle portion of said bead being located centrally between said ends of said bead and being generally cylindrical in shape and said two end portions of said bead each being generally conical and in going from said middle portion to the associated one of said two ends tapering from the diameter of said middle portion to a smaller diameter at said associated one of said ends.

8. The method of attaching a metal bead to the main wire of a musical instrument string as defined in claim 7 further characterized by said two surfaces between which said bead is pressed being substantially flat and parallel to one another and provided by two dies.

9. The method of attaching a metal bead to the main wire of a musical instrument string as defined in claim 8 further clarcterized by providing at least one of said dies with means causing it to imprint a mark on said bead during the pressing of said bead between said two surfaces.

10. The method of attaching a metal bead to a main wire of a musical instrument string, which method comprises the steps of: providing an apertured metal bead, exposing said bead in its entirety to a treating environment so that both its outer surface and its hole surface become irregularized, tumbling said bead to change the nature of its outer surface while leaving said hole surface irregular, threading said bead onto the end portion of a musical instrument string main wire, and then plastically deforming said bead to permanently press its hole surface irregularities into the surface of said wire to fix said bead to said wire.

11. The method of attaching a metal bead to the main wire of a musical instrument string, which method comprises the steps of: providing a metal bead having two ends and a hole defined by a hole surface with irregularities extending therethrough between said ends, said bead also having a generally cylindrical middle portion located centrally between said ends of said bead and two end portions on opposite sides of said middle portion each of which is generally conical and each of which in going from said middle portion to the associated one of said two ends tapers from the diameter of said middle portion to a smaller diameter at said associated one of said ends, threading said bead onto the end portion of a musical instrument main wire, and then plastically deforming said bead by pressing said middle portion thereof between two generally flat surfaces to permanently press said irregularities of said hole surface into the surface of said wire to fix said bead to said wire, whereby the deformation which occurs at said ends of said bead during said pressing step is substantially less than that which occurs in said middle portion.

* * * * *